(12) United States Patent
Todd et al.

(10) Patent No.: US 8,315,230 B2
(45) Date of Patent: *Nov. 20, 2012

(54) WLAN-TO-WWAN HANDOVER METHODS AND APPARATUS USING A WLAN SUPPORT NODE HAVING A WWAN INTERFACE

(75) Inventors: Terence D. Todd, Hamilton (CA); Seyed Vahid Azhari, Hamilton (CA)

(73) Assignee: McMaster University, Hamilton, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/327,270

(22) Filed: Dec. 15, 2011

(65) Prior Publication Data

US 2012/0087343 A1 Apr. 12, 2012

Related U.S. Application Data

(63) Continuation of application No. 11/553,319, filed on Oct. 26, 2006, now Pat. No. 8,095,175.

(51) Int. Cl.
*H04W 36/00* (2009.01)

(52) U.S. Cl. ........ 370/331; 455/552.1; 455/445; 455/440; 455/438; 370/338; 370/328; 370/401

(58) Field of Classification Search ........ 455/552.1, 455/456.3, 436, 440, 445, 437, 44; 370/328, 370/437, 329, 338, 331, 401

See application file for complete search history.

(56) References Cited

U.S. PATENT DOCUMENTS

| | | | | |
|---|---|---|---|---|
| 7,715,837 | B2* | 5/2010 | Lehtovirta et al. | 455/424 |
| 7,916,715 | B2* | 3/2011 | Rezaiifar et al. | 370/352 |
| 2003/0063581 | A1* | 4/2003 | Shanbhag et al. | 370/328 |
| 2005/0141541 | A1* | 6/2005 | Cuny et al. | 370/437 |
| 2005/0271018 | A1* | 12/2005 | Liu et al. | 370/338 |
| 2006/0109814 | A1* | 5/2006 | Kuzminskiy et al. | 370/329 |
| 2006/0245408 | A1* | 11/2006 | Lee et al. | 370/338 |
| 2006/0274688 | A1* | 12/2006 | Maxwell et al. | 370/328 |
| 2007/0010261 | A1* | 1/2007 | Dravida et al. | 455/456.3 |
| 2007/0171852 | A1* | 7/2007 | George et al. | 370/328 |

* cited by examiner

*Primary Examiner* — Jean Gelin
*Assistant Examiner* — Mahendra Patel
(74) *Attorney, Agent, or Firm* — John J. Oskorep, Esq.

(57) ABSTRACT

A network support node which includes a local area network (LAN) interface and a cellular RF interface is provided. The LAN interface is configured to connect the network support node as a LAN node in a LAN. The cellular RF interface is configured to provide wireless communications over a wireless communication link with a base station of a cellular network, such that the network support node operates as a client end station with the base station. The network support node receives, from the LAN via the LAN interface, data of a communication session between a mobile communication device and another communication device. The network support node communicates with the mobile communication device, via the cellular RF interface over the wireless communication link with the base station, the data of the communication session.

15 Claims, 9 Drawing Sheets

WLAN-TO-WWAN HANDOVER METHODS AND APPARATUS USING A WLAN SUPPORT NODE HAVING A WWAN INTERFACE

CROSS-REFERENCE TO RELATED APPLICATION

The present application is a continuation of and claims priority to U.S. non-provisional patent application having application Ser. No. 11/553,319 and filing date of 26 Oct. 2006, now U.S. Pat. No. 8,095,175 which is hereby incorporated by reference herein.

BACKGROUND

1. Field of the Technology

The present disclosure relates generally to handover methods and apparatus between wireless local area networks (WLANs) and wireless wide area networks (WWANs) for mobile communication devices.

2. Description of the Related Art

The present disclosure relates generally to handover methods and apparatus between heterogeneous wireless networks, such as WLANs (e.g. IEEE 802.11 based networks) and WWANs (e.g. cellular telecommunication networks), for mobile communication devices. The specific problem addressed relates to the support of real-time voice calls (or other media communications) when "multi-mode" devices are utilized in enterprise network environments.

In such environments, each mobile device has a WLAN radio interface and a cellular radio interface. When a voice call is active via the WLAN radio interface and the mobile device roams out of WLAN coverage, the voice call is maintained by re-connecting it through the cellular radio interface of the mobile device. The transition between these two radio interfaces and networks is referred to as a vertical handover (VHO). The switch between interfaces must be done subject to strict latency constraints, so that the voice connection quality is not adversely affected.

In order to properly provide a VHO, the connection is normally split into two call "legs" which are anchored either in the cellular network or in the enterprise. The "anchor" is the point where the two call legs come together. When VHO occurs, one of these legs is replaced by a new call leg that is established through the wireless network (WLAN or cellular) to which the mobile device is handing over. Enterprise anchoring (EA) is complex from a user's point of view since the handover must be anchored and managed by equipment inside the enterprise, such as a Public Switched Telephone Network (PSTN) gateway or an IP Public Branch Exchange (PBX). Cellular network anchoring (CNA) pushes this complexity into the cellular network, which is more desirable from that point of view. CNA is often capable of much faster handovers since both WLAN and cellular call legs terminate inside the cellular operator's core network. The CNA model is typical of currently proposed carrier-based dual-mode device solutions such as IP Multimedia Subsystem (IMS) and Unlicensed Mobile Access (UMA). Enterprise anchoring normally incurs longer VHO execution delays than CNA because the new cellular call leg setup must propagate through the cellular core network, the PSTN, and the enterprise network.

The following documents are related to and may be referenced in the remaining discussion: [1] ETSI. "Requirements And Architectures For Interworking Between HIPERLAN/3 And 3rd Generation Cellular Systems". Technical Report TR 101 957, ETSI, August 2001; [2] http://www.umatechnology.org, 2005; [3] R. Katz M. Stemm. "Vertical handoffs in wireless overlay networks". *Mobile Networks and Applications* 3, pp. 335-350, 1998; [4] H. Choi et al. "A Seamless Handoff Scheme For UMTS-WLAN Interworking". In *GLOBECOM '04*, pp. 1559-1564, vol. 3, November-December 2004; [5] K. El Malki et al. "Low Latency Handoff In Mobile IPv4". draft-ietfmobileip-lowlatency-handoffs-v4-01, IETF, May 2001; [6] R. Chakravorty et al. "Performance Issues With Vertical Handovers—Experiences From GPRS Cellular And WLAN Hot-Spots Integration". In *PERCOM '04*, pp. 155-164, March 2004; [7] C. E. Perkins et al. "Route Optimization In Mobile IP". Mobile IP working group, Internet draft—Work in progress, November 1997; [8] C. E. Perkins et al. "Optimized Smooth Handoffs In Mobile IP". In *IEEE International Symposium on Computers and Communications*, pages 340-346, July 1999; [9] T. Adachi and M. Nakagawa. Capacity Analysis For A Hybrid Indoor Mobile Communication System Using Cellular And Ad-Hoc Modes. In *The 11$^{th}$ IEEE International Symposium on Personal, Indoor and Mobile Radio Communications (PIMRC'2000)*, vol. 2, pp. 767-771, 2000; [10] R.-S. Chang, W.-Y. Chen, and Y.-F. Wen. "Hybrid Wireless Network Protocols". *IEEE Transactions on Vehicular Technology*, 52(4): 1099-1109, July 2003; [11] X. Wu, S-H. G. Chan, and B. Mukherjee. MADF: A Novel Approach To Add An Ad-Hoc Overlay On A Fixed Cellular Infrastructure. In *IEEE Wireless Communications and Networking Conference (WCNC '2000)*, vol. 2, pp. 549-554, 2000; [12] C. Qiao and H. Wu, iCAR: An Intelligent Cellular And Ad-Hoc Relay System. In *Ninth International Conference on Computer Communications and Networks*, pages 154-161, 2000; [13] Y.-D. Lin and Y.-C. Hsu, Multihop Cellular: A New Architecture For Wireless Communications. In *IEEE INFOCOM 2000*, vol. 3, pp. 1273-1282, 2000; [14] B. S. Manoj R. Ananthapadmanabha and C. S. R Murthy. Multi-Hop Cellular Networks: The Architecture And Routing Protocols. In *12th IEEE International Symposium on Personal, Indoor and Mobile Radio Communications*, vol. 2, pp. G78-G82, 2001; [15] T. Rouse, I. Band, and S. McLaughlin. Capacity And Power Investigation Of Opportunity Driver Multiple Access (ODMA) Networks In TDD-CDMA Based Systems. In *IEEE International Conference on Communications*, 2002; [16] G. N. Aggelou and R. Tafazolli. On The Relaying Capability Of Next-generation GSM Cellular Networks. In *IEEE Personal Communications*, pp. 40-47, February 2001; [17] J. H. Yap, X. Yang, S. Ghaheri-Niri, and R. Tafazolli. Position Assisted Relaying And Handover In Hybrid Ad Hoc WCDMA Cellular System. In *13$^{th}$ IEEE International Symposium on Personal, Indoor, and Mobile Radio Communications (PIMRC'2002)*, Lisbon, Portugal, pp. 2194-2198, September 2002; [18] E. Balafoutis A. Panagakis and I. Stavrakakis. "Study Of The Capacity Of Multihop Cellular Networks". *Lecture Notes in Computer Science, Springer-Verlag*, 2811: 182-192, November 2003; [19] M. He, X. Wang, T. Todd, D. Zhao, and V. Kezys. Ad Hoc Assisted Handoff In IEEE 802.11 Infrastructure Networks. *International Journal on Computer and Communication Networks, to appear*, 2005; [20] J. Rosenberg et al. "SIP: Session Initiation Protocol". RFC 3261, 2002; [21] www.ovislink.ca/wls/gp1000.htm; [22] www.sourceo2.com/o2 developers/o2 technologies/gprs/technical overview; [23] B. Goodman. "Internet Telephony And Modem Delay". *IEEE Network*, 13(3):8-16, May-June 1999; [24] H. Velayos et al. "Techniques To Reduce The IEEE 802.11b Handoff Time". In *IEEE International Conference on Communications* vol. 7, pages 3844-3848, June 2004; and [25] www.techonline.com/community/ed_resource/14365.

With respect to such concerns, the European Telecommunications Standards Institute (ETSI) has specified two approaches for WLAN/WWAN interworking, namely, loose coupling approach and tight coupling approach (see reference [1] above). In the tight coupling approach, the WLAN is integrated into the service provider's cellular core network. An interworking gateway provides adaptation between the two systems. Tight coupling benefits from good handover delay and packet loss performance, as it uses the native cellular mobility management protocols. This approach is currently being standardized under the UMA or 3GPP-GAN activities (see reference [2] above). In contrast, a loosely-coupled approach connects the WLAN to the cellular network through an external IP network. This approach is potentially more scalable and less proprietary, but real-time handover may be more difficult to achieve. The loosely-coupled approach is the preferable choice for techniques of the present disclosure.

A VHO between different radio interfaces involves a variety of time-consuming procedures such as handover triggering, base station selection, authentication, service negotiation, and IP address acquisition. As the procedures are very time consuming, they can significantly disrupt real-time (e.g. voice) communication. This is particularly true when handing off in the WLAN-to-cellular direction, as WLAN signal degradation can be very abrupt and unexpected. In many common situations, such as when exiting a building during an active connection, WLAN coverage loss may occur with very little warning at all. Even if the cellular interface of the mobile device is active at the time of transition, considerable packet loss will typically occur before the connection is recovered.

Some of the first work on VHO was done as documented in reference [3] above, which used a combination of analytic models and testbed experiments, proposing to make use of a multicast address in the mobile device which receives advertisements from potential access points in an overlay. Handover initiation relies on the detection of periodic beacons from the different networks. It was shown that handover latencies can easily be as high as three (3) seconds. Fast beaconing and packet/header double-casting may reduce this delay to 800 msec (see reference [3] above). In reference [4] above, a smooth VHO scheme using pre-authentication and pre-registration was proposed for WLANs tightly coupled to a UMTS network. Pre-registration is a mobile IP-based fast handover scheme that triggers MIP handover before link layer handover, thereby limiting packet loss and handover delay to that caused by link layer handover (see reference [5] above). Moreover, by having the old AP buffer data packets during handover, data packet loss is further reduced. This forwarding mechanism is reasonable as the APs involved are typically separated by a small number of forwarding hops. This is usually not the case in a loosely-coupled WLAN/cellular architecture. Another study as documented in reference [6] above has experimented with a loosely-coupled MIPv6-based GPRS-WLAN testbed and has investigated the impact of VHO on TCP connections. Their experiments indicate a 3.8 sec VHO delay, and that by using fast router advertisements (RA), RA Caching, and binding update simulcasting, it may be reduced to about 1.36 sec.

In reference [7] above, a route optimization extension has been proposed for Mobile IP using the binding update message. A binding update can also be used to provide soft handover. Before completing the registration process and before the flow of data packets through the new foreign agent (NFA) starts, the mobile device requests that the NFA send a binding update to the old FA. The OFA then realizes the current IP address for the mobile device and forwards the data packets still arriving on the old path to the current location of the mobile device hence reducing packet loss. In another improvement to Mobile IP, documented in reference [8] above, a buffering and forwarding scheme is proposed at the foreign agents (FA) to reduce data loss during a handover. The FA buffers any data packet it is forwarding to the mobile device. When a handover occurs, the new FA requests the old FA to forward buffered data packets. The new FA in turn forwards these data packets to the mobile device. The idea of FA forwarding has also been presented in the context of a post-registration handover scheme which is an extension to Mobile IP (see reference [5] above). To take advantage of these proposals the foreign agents and the MIP protocol needs to be changed. Also, the forwarding is done through the wired network which is likely to be very lengthy in WLAN-to-cellular handover cases.

There has been a lot of recent activity that considers the inclusion of ad hoc relaying into wireless infrastructure networks. A variety of systems have been considered, which often differ on the basis of whether mobile devices have multiple air interfaces, whether ad hoc infrastructure is present, and whether WLAN and/or cellular is being considered. The system described in reference [9] above uses ad hoc networking to enable communications whenever nodes are within range without using the cellular infrastructure. This is also the objective in reference [10] above, but to maintain simplicity a maximum of two ad hoc hops may be used between the end stations. In Mobile Assisted Data Forwarding (MADF) described in reference [11] above, special forwarding channels are allocated from resources used by the existing cellular network. These channels are then used for relaying traffic between cells. A mobile device which is about to handover finds a mobile device within range and link quality with both itself and the AP and requests relaying. This extends the coverage of the current cell and provides time for the mobile device to complete its handover. The approach in Integrated Cellular Ad Hoc Relaying System (ICAR) described in reference [12] above is similar to this approach, but uses special pre-installed ad hoc relay stations (RSs) to move traffic between cells. The multi-hop cellular system incorporates ad hoc routing into the cellular network using the same air interface as that used by the cellular base stations (see references [13] and [14] above). This concept is similar to the opportunity driven multiple access (ODMA) system proposed in reference [15] above and the system described in reference [16] above.

In reference [17] above, a technique referred to as position-assisted relaying was proposed for WCDMA cellular networks with dual-mode stations. In this scheme, a nearby station may relay transmissions for another when that station's cellular link becomes unusable. Geo-location techniques such as GPS or OTDoA are used by the base station to select a candidate RS (see reference [17] above). In reference [18] above, ad hoc relaying was studied from a capacity viewpoint in an IEEE 802.11 network. This study showed that inband relaying can significantly degrade access point capacity due to interference effects. A multi-frequency approach is better from this point of view. In reference [19] above, ad hoc relaying was used in infrastructure-based IEEE 802.11 networks that are supporting real-time voice connections. In such a system, active voice calls must be handed off between access points when the mobile device passes from one wireless coverage area to another. In this case, relaying is used to extend WLAN coverage when a mobile device moves outside the range of an AP.

Again, a VHO between different radio interfaces involves a variety of time-consuming procedures which may significantly disrupt real-time (e.g. voice) communication. This is particularly true when handing off from the WLAN-to-WWAN direction, as WLAN signal degradation can be very abrupt and unexpected. In many situations, e.g. when exiting a building during an active connection, WLAN coverage loss may occur with very little warning at all. Even if the cellular interface of the mobile device is active at the time of transition, considerable packet loss will typically occur before the connection is recovered.

Accordingly, there is a need for improved WLAN-to-WWAN handover methods and apparatus that overcome the deficiencies of the prior art.

BRIEF DESCRIPTION OF THE DRAWINGS

Embodiments of present invention will now be described by way of example with reference to attached figures, wherein:

FIG. 6 illustrates a second state of the communication system from the previous FIG. 5, where a WLAN-to-WWAN transition indication for the mobile communication device has been identified such that the network support node operates to receive and communicate voice data of the communication session with the mobile communication via the WWAN over a wireless communication link of a base station of the WWAN;

FIG. 7 illustrates a third state of the communication system from the previous FIG. 6, where the previous connection between the mobile communication device and the WLAN via the access point is terminated;

FIG. 8 illustrates a fourth state of the communication system from the previous FIG. 7, where the connection portion through the communication network having the WLAN has been terminated.

DETAILED DESCRIPTION OF THE PREFERRED EMBODIMENTS

Figure 1:
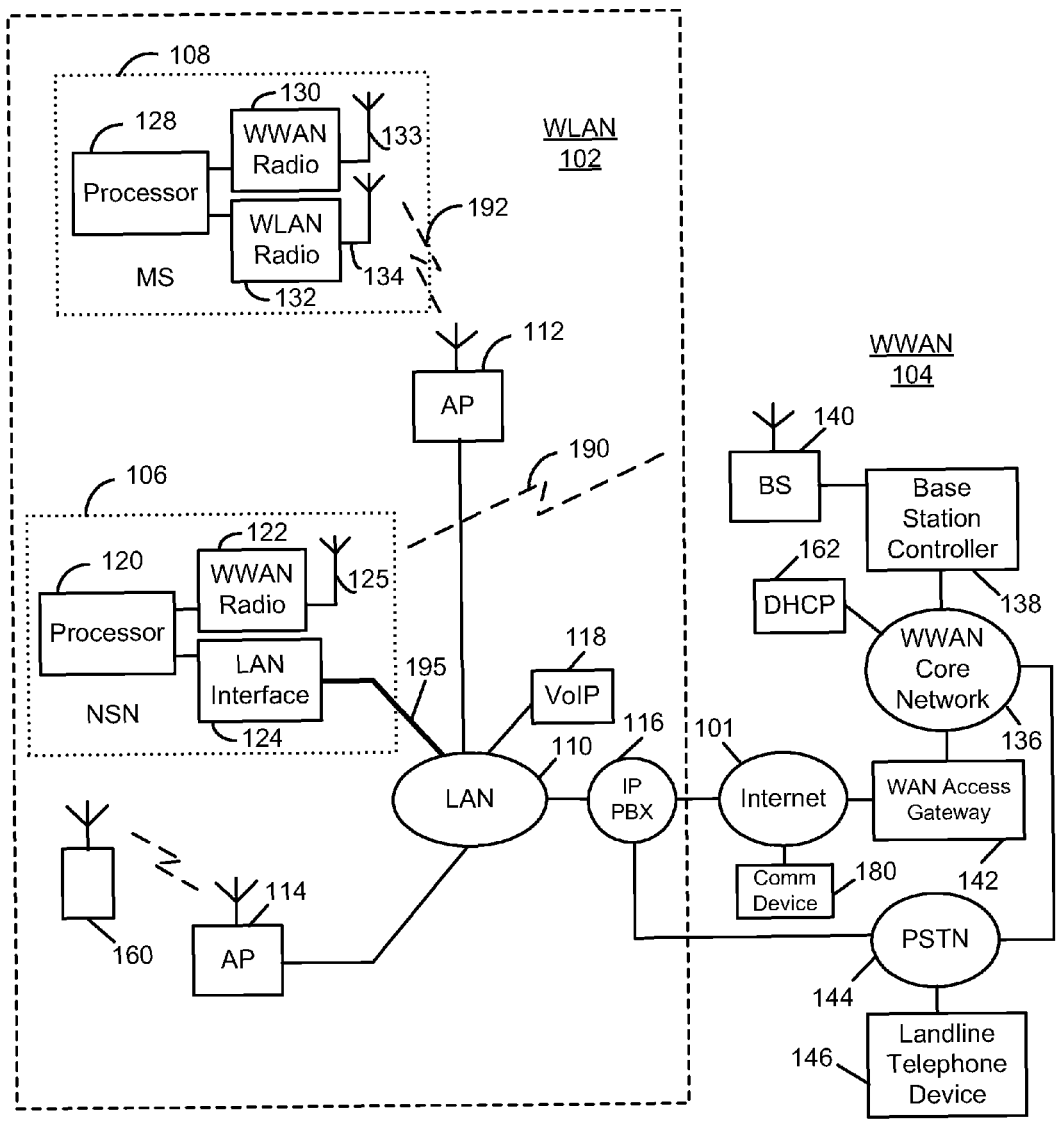
FIG. 1 is an illustrative representation of a communication system which includes a wireless local area network (WLAN) of a LAN and a wireless wide area network (WWAN) of a WAN, where the LAN has a network support node (NSD) to facilitate the switching of communication operations between the WLAN and the WWAN for a mobile communication device.

Methods and apparatus for use in switching communication operations between heterogeneous wireless networks, such as a wireless local area network (WLAN) (e.g. an IEEE 802.11-based network) and a wireless wide area network (WWAN) (e.g. a cellular telecommunications network), for a mobile communication device with use of a network support node are described herein. The network support node has a first communication interface (e.g. an Ethernet interface) for connection with a communication network which includes the WLAN, and a second communication interface (e.g. a cellular radio air interface) for communicating with a base station of the WWAN over a wireless communication link. In one illustrative scenario, the mobile device initially operates in the WLAN in a communication session with another communication device. During the session, the network support node receives an indication that the mobile device is transitioning from the WLAN to the WWAN. In response to receiving the indication, the network support node causes a message to be sent which instructs a router of the communication network to communicate voice data of the session to it. In response to the message, the network support node receives the voice data of the session from the router through its first communication interface. The network support node communicates the voice data with the mobile device via the WWAN through its second communication interface over the wireless communication link with the base station. These communications are performed at least while communication operations for the mobile device are being switched from the WLAN to the WWAN. Advantageously, disruption of communications during the WLAN-to-WWAN transition is reduced or eliminated.

According to the present disclosure, a network support node is attached locally to the wired LAN hotspot infrastructure and includes both a wired (e.g. Ethernet) LAN interface and a cellular air interface. The network support node may be referred to as a Vertical Handover Support Node (VHSN). The network support node does not extend any wireless coverage as in typical multi-hop forwarding mechanisms, and does not communicate directly with any mobile device. Rather, the network support node connects to the local cellular base station as a conventional client mobile device. This is a notable distinction as the network support node operates as a simple Ethernet LAN and cellular client end station. When a mobile device has an abrupt loss of WLAN coverage, the network support node is used to quickly redirect the connection through the local cellular base station which then forwards it to the mobile device. Since the cellular base station is local this action has the potential for reestablishing the connection quickly, before the rest of the handover occurs. Unlike ad hoc or infrastructure-based relaying, the proposed mechanism does not use any frequency resources that have not already been deployed by the cellular network. The link between the network support node and the base station is highly reliable since the network support node is fixed. A single network support node may also service an entire WLAN subnet, subject to capacity constraints and air interface capabilities. Preferably, the handover process is mobile device-initiated which allows the approach to be suitable for IEEE 802.11.

The inherent system latencies for switching communication operations from WLAN to WWAN for a mobile device are now described. In the environment considered, the WLAN is assumed to be inside the coverage area of a base station of the WWAN as would normally be the case. Mobility management is performed using Session Initiation Protocol (SIP) signaling, but this is not a requirement. A primary advantage of SIP is that it accommodates IP address change and thus can be used in networks which do not have native support for mobile IP. The cellular network assigns link layer IDs to mobile devices when they initially connect. IP addresses, either public or NAT'ed, are also assigned. It is also assumed that the cellular network can provide connectionless packet-switched service between layer-2 entities directly through the base stations using their link layer IDs, provided they are under supervision of the same base station.

As soon as a mobile device is powered on, it establishes a link layer association with the cellular network, regardless of whether WLAN coverage is available. As is expected to be the case in practical systems, the mobile devices are able to operate both radio interfaces simultaneously. Note, however, a power consumption penalty will be paid if the mobile device chooses to use both interfaces at all times. A demand-assignment TDMA air interface is assumed for the cellular network as would be the case in a 4G cellular network. Note, however, that any suitable air interface may be utilized. Mobile devices make resource requests from the base station during a set of predefined contention-based time-slots. An unsuccessful request must be retransmitted in a future contention slot after random backoff. Upon receiving a resource request, the base station assigns time slots (if available) to the requesting mobile device and sends this allocation in a time-slot map in the next frame. For real-time data packet flows, an extended resource allocation scheme can be used which spans multiple superframe periods. First, the mobile device sends a standard resource request. After being granted time slots, instead of sending actual data the mobile device sends an extended resource request for a longer duration of time. The base station then allocates time slots to the mobile device.

The following is a list of parameters and variables associated with typical VHO latency. Some typical default values have been indicated. An asterisk refers to parameters corresponding to control/command messages in contrast to real-time data traffic. For a particular VHO instance, $t^{WLAN}_{FAIL}$ is defined to be the average elapsed time from VHO initiation until WLAN coverage fails.

$T_{frame}$: Cellular frame duration (e.g. 4.845 msec default)

$t^u_{mac}, t^{*u}_{mac}$: Cellular radio channel access latency (e.g. two or four frame times)

$t^d_{mac}, t^{*u}_{mac}$: Cellular base station radio channel access latency (two frame times)

$t^u, t^d$: Up/Downlink data packet transfer delay $t_{AUTH}$: Cellular re-authentication latency (e.g. 50 msec)

$t^{IP}_{proc}$: Cellular IP address assignment processing latency (e.g. 10 msec)

$t_{CORE}$: Cellular core network delay (e.g. 20 msec, see reference [22])

$t_{NET}$: Internet transit delay (e.g. 50 msec, see reference [23])

$t_{CONNECT}$: Cellular link layer resolution processing latency (e.g. 20 msec)

The conventional VHO case is now considered, from WLAN to WWAN, in an illustrative environment not intended to limit the techniques of the present disclosure. When a mobile device is moving out of WLAN coverage, it eventually detects a substantial decrease in its received signal strength indicator (RSSI) and initiates the scanning process to find a target access point (AP). This scanning latency can take between 87 and 288 milliseconds for some commercial WLANs (e.g. see reference [24] above). Unfortunately, a mobile device is not normally aware of whether a WLAN to WLAN handover is possible and it may have to deduce this after failing to identify any candidate AP. This may entail repeatedly scanning for WLAN coverage before initiating VHO. As an alternative, the mobile device may be scanning more proactively, and may already have completed its search for candidate APs. Once the VHO is triggered, the mobile device uses its cellular interface to acquire an IP address from the cellular network. This may be preceded by a re-authentication procedure. The cellular leg of the call is then established using SIP signaling.

To mitigate the undesirable effects described, a network support node is attached locally to the wired LAN hotspot infrastructure. The network support node contains both a wired (Ethernet) LAN interface and a cellular air interface. The network support node does not extend any wireless coverage as in typical multi-hop forwarding mechanisms, and does not communicate directly with any mobile device. When installed, the network support node connects to the local cellular base station as a conventional client mobile device. This is a notable distinction as the network support node operates as a simple Ethernet LAN as well as a cellular client end station. When a mobile device has an abrupt loss of WLAN coverage, the network support node is used to quickly redirect the connection through the local cellular base station which then forwards it to the mobile device. Since the cellular base station is local this action has the potential for reestablishing the connection quickly, before the rest of the handover occurs. Unlike ad hoc or infrastructure-based relaying, the proposed mechanism does not use any frequency resources that have not already been deployed by the cellular network. The link between the network support node and the base station is highly reliable since the network support node is fixed. A single network support node can also service an entire WLAN subnet, subject to capacity constraints and air interface capabilities.

Again, to mitigate the problem of abrupt outage and loss prior to VHO, a network support node attached to the LAN subnet to which the WLAN access points are connected is utilized. When an abrupt WLAN outage occurs, the network support node obtains access to all incoming data packets destined for the mobile device in the LAN. This may be done by having the network support node issue a gratuitous Address Resolution Protocol (ARP) to a router in the LAN, in a manner similar to that performed by a home agent in standard mobile IP. The network support node then functions as a forwarding node during this transition period. The network support node sends all intercepted data packets destined to the mobile device through the cellular base station, which forwards them directly to the mobile device. In addition, the network support node forwards data packets from the mobile device over the WLAN interface in the opposite direction. Preferably, the forwarding procedure through the cellular base station is made possible through use of a packet-oriented cellular air interface. Once this media path is established, the mobile device initiates a full handover by redirecting the media flow so that eventually it follows a final media path which is no longer routed through the LAN/WLAN. This can be a hard or soft handover depending upon the native procedures used by the mobile device.

Figure 9:
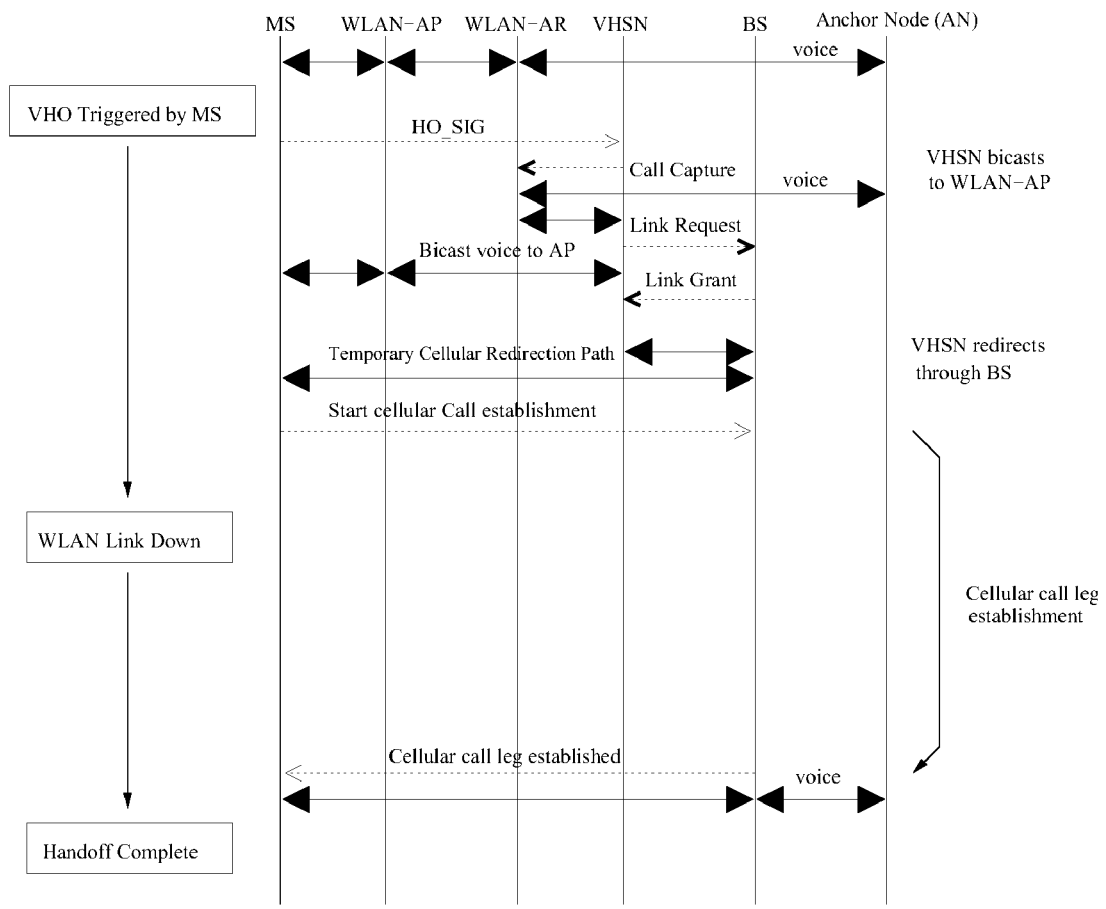
FIG. 9 is a timing diagram which is used to describe a more detailed embodiment of the handover process of the present disclosure.

As an illustrative, non-limiting example, a technique is now described with reference to the timing diagram shown ahead in relation to FIG. 9. In the figure, the network support node is referred to as a Vertical Handover Support Node (VHSN) for performing a vertical handover (VHO). (1) The mobile device's WLAN AP link RSSI decreases until reaches the handover threshold (e.g. HO THR), where it is then unable to find a candidate AP for WLAN handover. In response, the mobile device sends a handover signal packet (e.g. HO SIG) to the network support node through its WLAN connection. This prepares network support node for connection redirection through the local cellular BS. Note, however, that other more sophisticated detection schemes are realizable as alternatives. The HO SIG contains information including cellular link layer and WLAN IP addresses of the mobile device. (2) At this phase, there are two independent processes running in parallel: (a) the network support node is receiving data packets destined to the mobile device through the local WLAN-AR (access router) and bicasting them to the mobile device through both the cellular base station and the WLAN AP, and data packets are also relayed in the opposite direction; and (b) the mobile device has initiated a cellular connection to the anchor node (AN) (such as a controller, IP-PBX or gateway). The delay incurred before the mobile device starts receiving data packets from the network support node through its cellular interface may be represented as $$T_{initial} = T_{CONNECT} + T^u_{mac} + T^u + T^d_{mac} + T^d$$

as the summation of the time it takes for the network support node to access the cellular radio, $T^u_{mac}$, send the first uplink data packets towards the base station, $T^u$, and for the base station to send the first downlink data packet to the mobile device, in addition to the redirection link establishment time, $T_{CONNECT}$. Once a link is set up between the network support node and the mobile device, the additional data packet delay between them will be $T^u$ and $T^d$ (i.e. uplink and downlink latencies). (3) The third leg of the call is then created and a soft handoff mechanism using the anchor node causes the WLAN leg of the call to be disconnected. However, data packets previously sent along the WLAN path will still be arriving at the WLAN which will be collected and forwarded by the network support node. When all data packets destined to the WLAN have been delivered, the functions of the network support node are completed. In the proposed technique, data packets from the mobile device are also sent through the redirection link to the network support node and, from there, delivered to their destination until the mobile device establishes the cellular leg of the connection to the anchor node.

For some cellular networks, such as General Packet Radio Service (GPRS) networks, sending layer-2 data packets on the access network may not be possible without first obtaining an IP address. In such cases, the mobile device can acquire a cellular IP address upon power-up, which will also help "pipeline" the VHO process. However, keeping the IP address alive will typically require periodic communication with the cellular network. In such cases, the mobile device may always contact the network support node through the cellular interface after acquiring an IP address. This increases the initial delay by the added waiting time from when the WLAN link fails to when the IP address is obtained.

There are several advantages to the present link recovery scheme. The handover process is mobile-initiated and there are no significant upgrades required on the WLAN or cellular networks. The network support node uses the cellular network just as any other cellular station. The forwarding mechanism is also independent of the mobility management scheme used, and is highly suitable for situations where there are abrupt losses of WLAN coverage. Moreover, the additional signaling required is minimal.

To illustrate basic network architecture for the present techniques, FIG. 1 is an illustrative representation of a communication system 100 which includes a wireless local area network (WLAN) 102 and a wireless wide area network (WWAN) 104. In the embodiment described, WLAN 102 is an IEEE 802.11-based WLAN and WWAN 104 is a cellular telecommunications network. WLAN 102 may be part of a communication network such as a local area network (LAN) 110. In this embodiment, LAN 110 is part of a private communication network which may be referred to as an enterprise network of an enterprise having a gateway which may include a firewall. Communications between LAN 110 and WWAN 104 may be facilitated via a connecting network such as a broadband IP network such as the Internet 101.

Terminals may connect to LAN 110 through any suitable means, such as through a plurality of wireless access points (APs) of WLAN 102. FIG. 1 shows two wireless APs of WLAN 102, namely, a wireless AP 112 and a wireless AP 114, although WLAN 102 may include any suitable number of such APs. Such mobile communication devices and wireless APs operate in accordance with well-known IEEE 802.11 standards. In this example, communication devices 108 and 160 shown operating in WLAN 102 are mobile communication devices/mobile stations (MSs)/wireless handsets (WHs) of the dual-mode type, having both WLAN and WWAN radio interfaces. For example, communication device 108 is shown to have one or more processors 128, a WLAN radio interface 132 coupled to an antenna means 134, and a WWAN radio interface 130 coupled to an antenna means 133. Communication device 108 is shown to be associated with and communicating via wireless AP 112 over a wireless communication link 192, whereas communication device 160 is shown to be associated with and communicating via wireless AP 114.

LAN 110 which includes WLAN 120 provides various data and communication services to its terminals. For example, LAN 110 may provide for voice telephony communication services for its terminals with use of Voice over IP (VoIP) communications. For such services, LAN 110 may utilize servers such as a VoIP type server 118 or at least one session server which is a session initiation protocol (SIP) server. Today, communication applications, such VoIP applications, for terminals require the use of SIP. SIP is well-documented in standard documents such as Request For Comments (RFC) 3261. An IP Public Branch Exchange (IP PBX) controller or equipment 116, which may be more generally referred to as a gateway, is provided and coupled to LAN 110 for interfacing with both Internet 101 and Public Switched Telephone Network (PSTN) 144. IP PBX controller 116 is adapted to facilitate calls with other telephone equipment such as a communication device 180 (which may be referred to as a called node or CN) in Internet 101 and/or a landline telephone device 146. WWAN 104 which may be the cellular telecommunications network includes a WWAN core network 136, a plurality of base station controllers such as a base station controller (BSC) 138 coupled to WWAN core network 136, and a plurality of base stations such as a base station (BS) 140 coupled to associated BSCs 138. WWAN core network 136, BSC 138, and BS 140 operate primarily in accordance with conventional telecommunication techniques. An address assigning component, such as a Dynamic Host Configuration Protocol (DHCP) server 162, is connected in WWAN core network 136 for assigning IP addresses of a public IP pool to mobile devices operating in WWAN 104. A WWAN (e.g. cellular) access gateway 142 (or, more generally, call control equipment) may be provided in order to facilitate communication switching operations (e.g. roaming, handovers) between WLAN 102 and WWAN 104 at least in some situations.

A network support node (NSN) 106 is provided in LAN 110 to facilitate vertical handovers between WLAN 102 and WWAN 104 for mobile communication devices operating in WLAN 102. In FIG. 1, network support node 106 is shown to have one or more processors 120, a LAN communication interface 124, and a WWAN radio interface 122 coupled to an antenna means 125. LAN communication interface 124 is connected to LAN 110 for data communications between network support node 106 and LAN 110. LAN communication interface 124 is preferably a reliable wired communication interface having a wired connection 195 between network support node 106 and LAN 110. Most preferably, LAN communication interface 124 is an Ethernet interface compliant with the IEEE 802.3 standard, where wired connection 195 is an Ethernet connection. Being connected to LAN 110 via wired connection 195, network support node 106 is typically fixed in position in LAN 110.

Network support node 106 is also operative to maintain communications with WWAN 104 through its WWAN radio interface 122. In particular, WWAN radio interface 122 maintains communications with base station 140 of WWAN 104 over a wireless communication link 190. As in this scenario WWAN 104 is a cellular telecommunication network, WWAN radio interface 122 operates in accordance with the pertinent cellular air interface standard of WWAN 104; in this regard, network support node 106 operates as a mobile communication device in WWAN 104. Since network support node 106 is preferably fixed in position, it preferably communicates via the same single base station 140 of WWAN 104 throughout its operation.

Having previously registered with WWAN 104, network support node 106 typically maintains communications with base station 140 of WWAN 104 in an idle mode state, where network support node 106 "camps on" a broadcast channel. When communication of voice data is taking place via network support node 106, one or more traffic channels of the wireless communication link 190 which carry the voice data are established and maintained for the communications. The wireless communication link 190 and/or the one or more traffic channels with base station 140 may be maintained continuously during operation, or triggered in response to certain network conditions (e.g. when a vertical handover for a mobile device is pending, or when any one of the mobile devices in WLAN 102 is involved in a voice call, etc.). Network support node 106 serves not one, but rather all, suitable mobile devices operating in WLAN 102 for vertical handover purposes.

Figure 2:
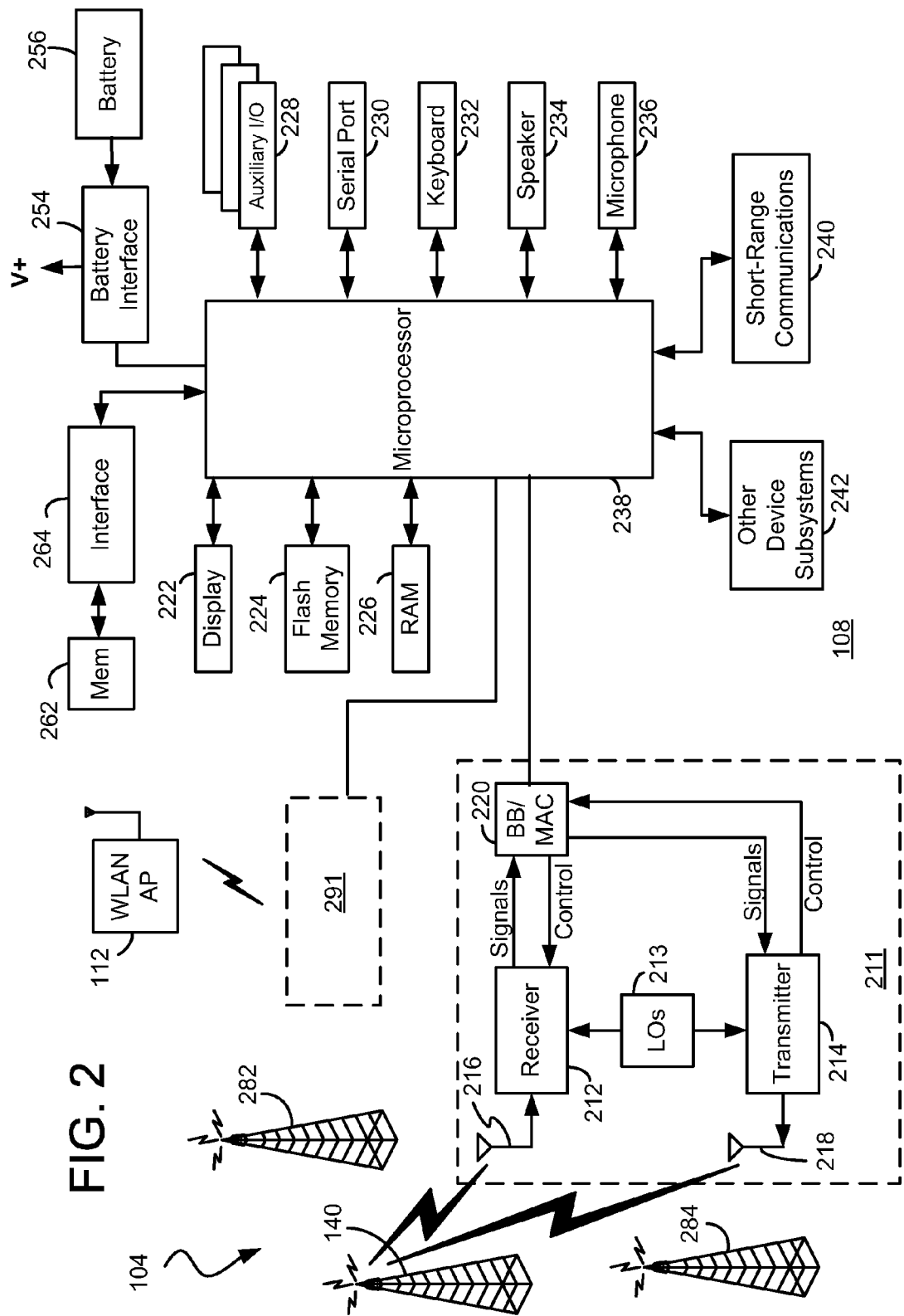
FIG. 2 is a schematic diagram of the mobile communication device (e.g. a mobile station (MS)) which is operative in both the WLAN and the WWAN of FIG. 1.

Referring now to FIG. 2, electrical components of a typical mobile communication device 108 (e.g. a mobile station or handheld wireless handset) which operates in both WLANs and WWANs of FIG. 1 are now described. Mobile device 108 is preferably a two-way communication device having at least voice and advanced data communication capabilities, including the capability to communicate with other computer systems. Depending on the specific functionality and options provided by mobile device 108, it may be referred to as a data messaging device, a two-way pager, a cellular telephone with data messaging capabilities, a wireless Internet appliance, or a data communication device (with or without telephony capabilities).

Preferably, mobile device 108 is a wireless handset which operates in accordance with both a WWAN or cellular network interface standard (e.g. GSM/GPRS standards) and a WLAN or IEEE 802.11 standard. As shown in FIG. 2, mobile device 108 is adapted to wirelessly communicate with WWAN 104 via a plurality of base stations 140, 282, and 284 utilizing a communication subsystem 211. Mobile device 108 is also adapted to wirelessly communicate with WLANs via a plurality of wireless APs, such as wireless AP 112, utilizing a communication subsystem 291. With such configuration, mobile device 108 may be referred to as a "dual mode" mobile device. Although mobile device 108 may have separate and independent subsystems for these purposes, at least some portions or components of these otherwise different subsystems may be shared where possible.

Communication subsystem 211 for the WWAN includes a receiver 212, a transmitter 214, and associated components, such as one or more (preferably embedded or internal) antenna elements 216 and 218, local oscillators (LOs) 213, and a DSP 220. As will be apparent to those skilled in the field of communications, the particular design of communication subsystem 211 depends on the communication network in which mobile device 108 is intended to operate. Mobile device 108 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These processed signals are input to transmitter 214 for digital-to-analog (D/A) conversion, frequency up conversion, filtering, amplification and transmission through the network via antenna 218. DSP 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Communication subsystem 291 for the WLAN has components similar to those in communication subsystem 211 for the WWAN (including its associated processor/processing components), but are operative in accordance with IEEE 802.11 standards. For communication subsystem 291, DSP 220 may be replaced with a processing module referred to as a baseband (BB) and media access control (MAC) processing module.

Since mobile device 108 may be a portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 108 includes a microprocessor 238 (one type of processor or controller) that controls overall operation of mobile device 202. This control includes the network transitioning techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 108. A predetermined set of applications that control basic device operations, including at least data and voice communication applications, will normally be installed on mobile device 108 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 and SIM 256 (denoted as "Mem" in the FIG. 2) to facilitate storage of PIM data items and other information.

The PIM application preferably has the ability to send and receive data items via the wireless network. The PIM data items may be seamlessly integrated, synchronized, and updated via the wireless network, with the wireless device user's corresponding data items stored and/or associated with a host computer system thereby creating a mirrored host computer on mobile device 108 with respect to such items. This is especially advantageous where the host computer system is the wireless device user's office computer system. Additional applications may also be loaded onto mobile device 108 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 108 and may provide enhanced on-device functions, communication-related functions, or both. For example, secure communication applications may enable electronic commerce functions and other such financial transactions to be performed using mobile device 108.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 108 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications (e.g. VoIP calls), the overall operation of mobile device 108 is substantially similar, except that the received signals would be output to speaker 234 and signals for transmission would be generated by microphone 236. Alternative voice or audio I/O subsystems, such as a voice message recording subsystem, may also be implemented on mobile device 108. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 108 by providing for information or software downloads to mobile device 108 other than through a wireless communication network. The alternate download path may, for example, be used to load an encryption key onto mobile device 108 through a direct and thus reliable and trusted connection to thereby provide secure device communication. Short-range communications subsystem 240 of FIG. 2 is an additional optional component that provides for communication between mobile device 108 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile device 108 has just been described, any suitable mobile communication device or terminal may be part of the inventive methods and apparatus which will be described in fuller detail below.

Figure 3:
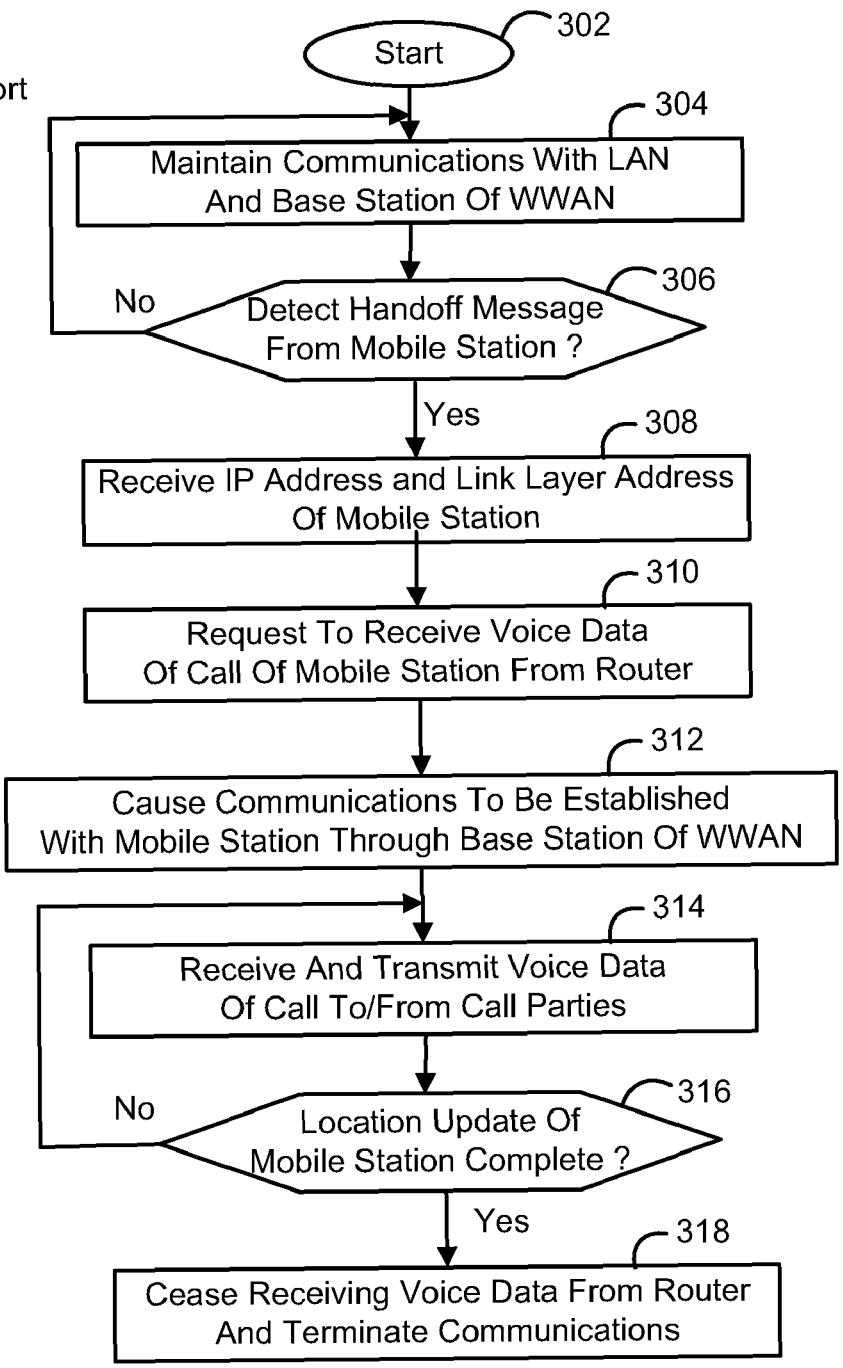
FIG. 3 is a flowchart which describes a network support node (NSN) method of switching communication operations between WLANs and WWANs for calls such as voice calls (e.g. VoIP calls) between communication devices.

FIG. 3 is a flowchart which describes a network support node (NSN) method for use in switching communication operations between WLANs and WWANs for calls such as voice calls (e.g. VoIP calls) between communication devices. The flowchart of FIG. 3 will be described together in relation to FIGS. 5-8, which are illustrations of the communication system of FIG. 1 presented in a chronological sequence according to the flowchart of FIG. 3.

The technique of FIG. 3 may be performed by network support node 106 of LAN 110 described in relation to FIG. 1. The network support node is adapted to communicate with a communication network which includes a WLAN, as well as adapted to communicate via a base station of a WWAN over a wireless communication link. The technique described may further be part of a computer program product which includes a computer readable medium and computer instructions stored in the computer readable medium for use in being executed by one or more processors of the network support node.

Initially, one of the mobile devices is operating in the WLAN in a communication session or call with another communication device. To illustrate with respect to FIG. 5, for example, the mobile device may be mobile device 108, the other communication device in the communication session may be communication device 180, and the communication session may be a voice call such as a VoIP call represented by a call connection 502 which is established through LAN 110 and WLAN 102. Note that the voice call is initially established as two separate call legs between mobile device 108 in WLAN 102 and communication device 180 via IP-PBX controller 116 (or "gateway").

Beginning at a start block 302 of FIG. 3, the network support node maintains communications with the base station of the WWAN over the wireless communication link (step 304 of FIG. 3). Having previously registered with the WWAN via the base station, the network support node typically maintains communications with the base station in an idle mode state, where the network support node "camps on" a broadcast channel of the WWAN. At least while communication of voice data is taking place via the network support node, one or more traffic channels of the wireless communication link which carry the voice data are established and maintained with the base station for the communications. The wireless communication link and/or the one or more traffic channels with the base station may be maintained continuously during operation, or triggered in response to certain network conditions (e.g. when a vertical handover for a mobile device is pending, or when any one of the mobile devices in the WLAN is involved in a voice call, etc.).

If the network support node receives an indication that any one of the mobile devices in the WLAN involved in a communication session is being handed over from the WLAN to the WWAN (tested in step 306 of FIG. 3), then the network support node causes a process for facilitating such handover for the mobile device in the following steps of the flowchart (i.e. steps 308-318). If no such indication is received, the network support node continues monitoring for such indications. When the indication or handover message is received as identified, the mobile device is leaving WLAN coverage and entering into the WWAN. Leaving WLAN coverage may be abrupt and communications of the mobile device may be disrupted if nothing is done to mitigate its effects. The network support node may receive such indication in step 306 by receiving a message (e.g. a handover message) from the mobile device or other component of the communication network. Note that the network support node performs such monitoring and processing for all suitable mobile devices in the WLAN that have registered with it or performed an initialization procedure with it in the computer network.

In response to the receipt of such indication in step 306, the network support node receives an IP address and a link layer address of the mobile device as identified in the communication network having the WLAN (step 308 of FIG. 3). Alternatively, this address information is obtained well in advance of the receipt of such indication (e.g. upon setup and/or regularly confirmed). The address information of the mobile device may be stored in memory of the network support node or in a network database in association with some other identification of the mobile device. The address information may be received in response to a query from the memory or database by the network support node, and/or may be initially received from the mobile device as part of the registration or initialization process of the mobile device entering the WLAN, or received from the mobile device in response to a specific request to the mobile device from the network support node.

Having the IP/link layer address of the mobile device, the network support node sends a request to a router of the computer network to receive the voice data of the voice call involving the mobile device from the router (step 310 of FIG. 3). This message may include the received IP address and/or the link layer address of the mobile device, so that the router may identify call traffic associated with this device and forward it to the network support node as requested. Preferably, the message is an Address Resolution Protocol (ARP) message to the router which includes both the IP address and the link layer address of the mobile device.

Next, the network support node causes a communication session to be established, via its WWAN radio interface, with the mobile device operating in the WWAN (step 312 of FIG. 3). In this step, a traffic channel may be established between the network support node and the base station. The network support node may contact or connect with the mobile device by sending one or more data messages to it through use an IP address of the mobile device in the WWAN. The communication session may involve VoIP, or other proprietary communications. Preferably, the communication session is a "local" communication session which is routed locally through the base station (and perhaps the base station controller) but not through the WWAN core network. At the other end of the call establishment, the mobile device "silently" and automatically receives and accepts the communications. In a variation of this technique, the mobile device initiates this session with the network support node.

Now that a communication session is established in the WWAN between the network support node and the mobile device, the network support node causes the voice data of the voice call involving the mobile device (i.e. the voice data received by step 310) to be received and transmitted via the WWAN in the communication session through the network support node to/from the call parties of the voice call (step 314 of FIG. 3). The communication of the voice data of the voice call will continue at least during the switching of communication operations between the WLAN and the WWAN for the mobile device.

Figure 6:
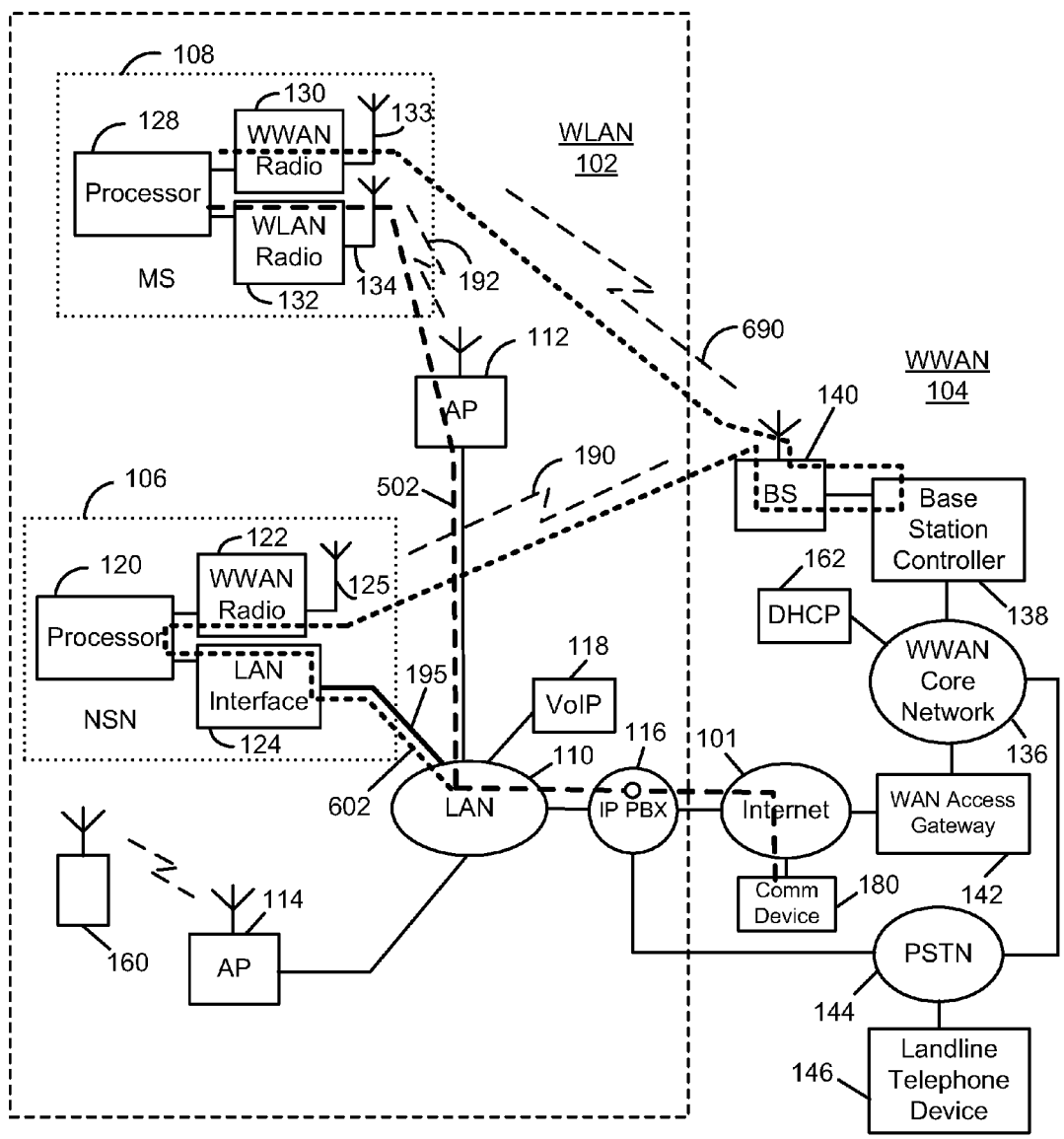

To illustrate with respect to FIG. 6, network support node 106 operates to maintain an additional communication session with mobile device 108 via WWAN 104 at least during the WLAN-to-WWAN switching operation for mobile device 108. The voice data are communicated between a router in LAN 110 and network support node 106 via an additional connection 602 as shown. However, these voice data are further communicated with mobile device 108 through network support node 108 via WWAN 104. Also apparent, the voice data are communicated to/from network support node 106 and base station 140 of WWAN 104 over wireless communication link 190, and to/from mobile device 108 and base station 140 of WWAN 104 over a wireless communication link 190. At some point in time, however, the mobile device may lose WLAN coverage completely, where a substantial portion of the original call connection 502 is terminated. This state is illustrated in connection with FIG. 7. Although the portion of the original call connection is terminated, call connection 602 through the network support node via WWAN 104 remains.

Figure 7:
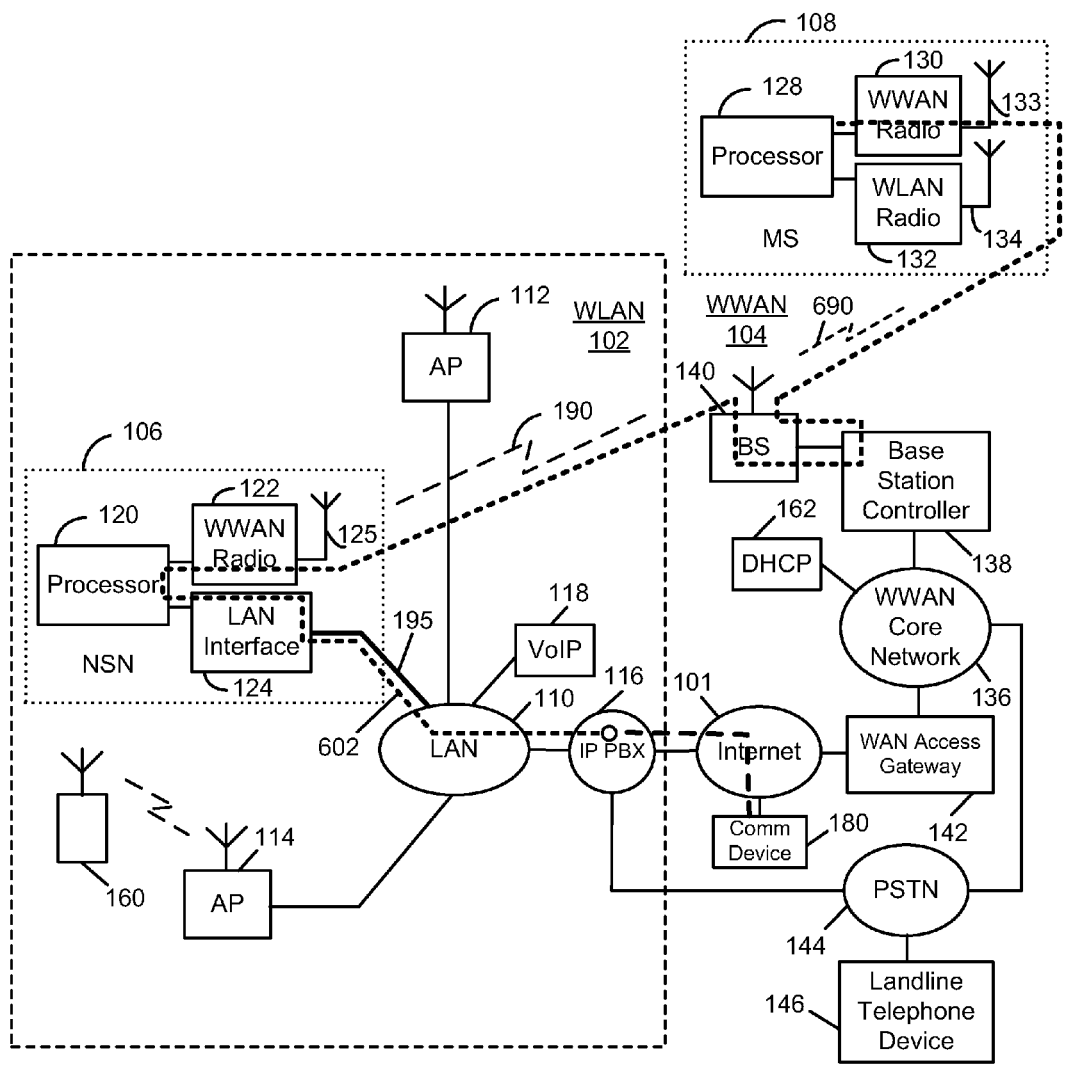
Figure 8:
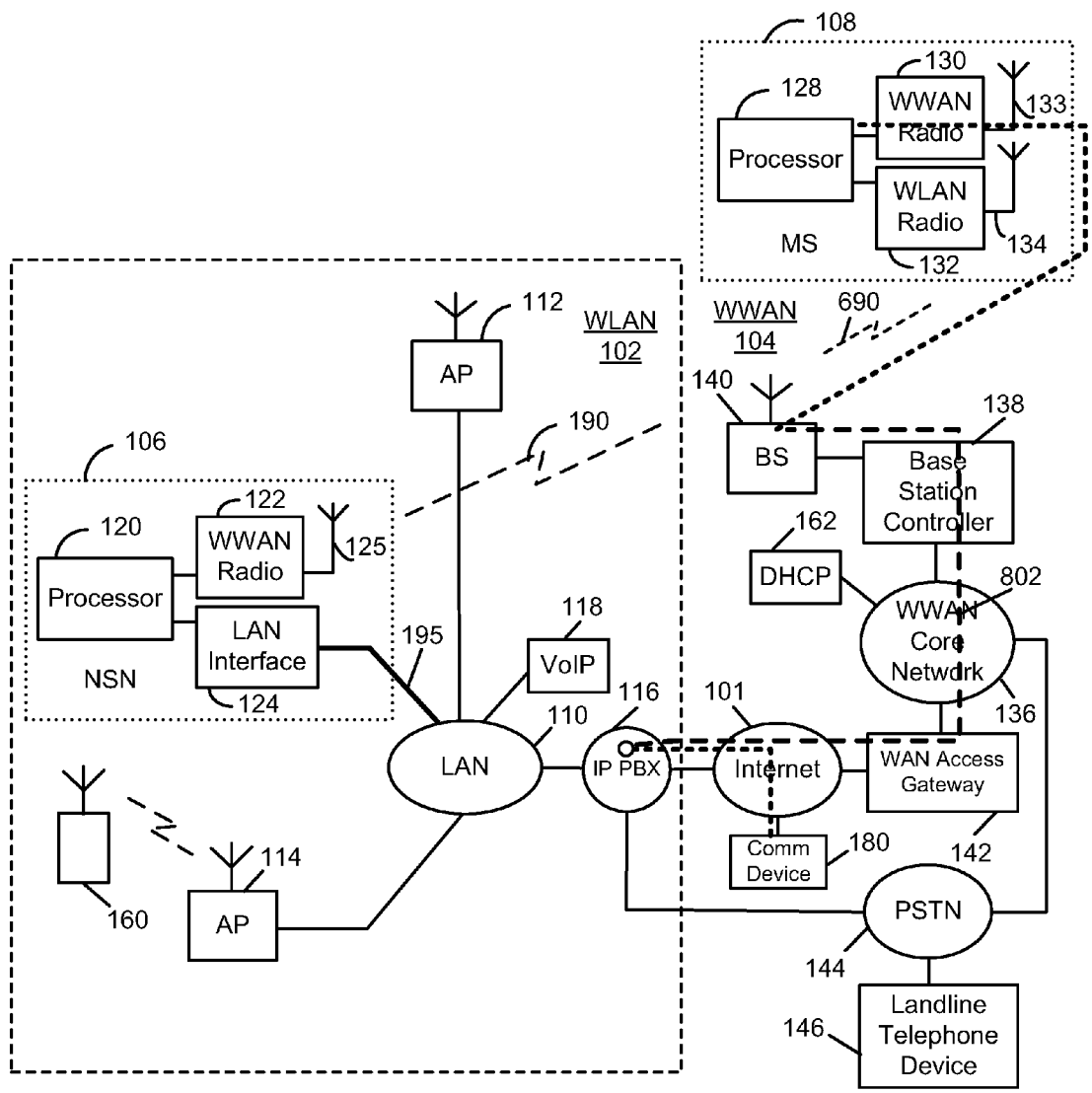

The mobile device operating in the WWAN has performed a location update in the WWAN with its newly-assigned IP address assigned by the WWAN (e.g. DHCP server 162 of FIG. 7). Thus, the network support node anticipates the confirmation of completion of the location update for the mobile device (step 316 of FIG. 3). Once the indication that the location update has been completed is received, the network support node ceases the receipt of the voice data from the router and terminates communications with the mobile device (step 318 of FIG. 3). After the location update is performed, the WAN reestablishes the call connections via WAN access gateway 142 so that the voice call is anchored within the WAN and outside of the LAN. This state is illustrated with respect to FIG. 8. Note that since two separate call legs were initially established between mobile device 108 in WLAN 102 and communication device 180 via IP-PBX controller 116, the call leg for mobile device 108 is controlled so as to "follow" the mobile device to WWAN 104, without requiring involvement of or special techniques at communication device 180 during the transition.

Note that, although the call and handover technique has been described with respect to communication device 180 on the Internet 101, the technique may be similarly performed with respect to a different type of communication device such as landline telephone device 146 in PSTN 144 without the use of WAN access gateway.

Figure 4:
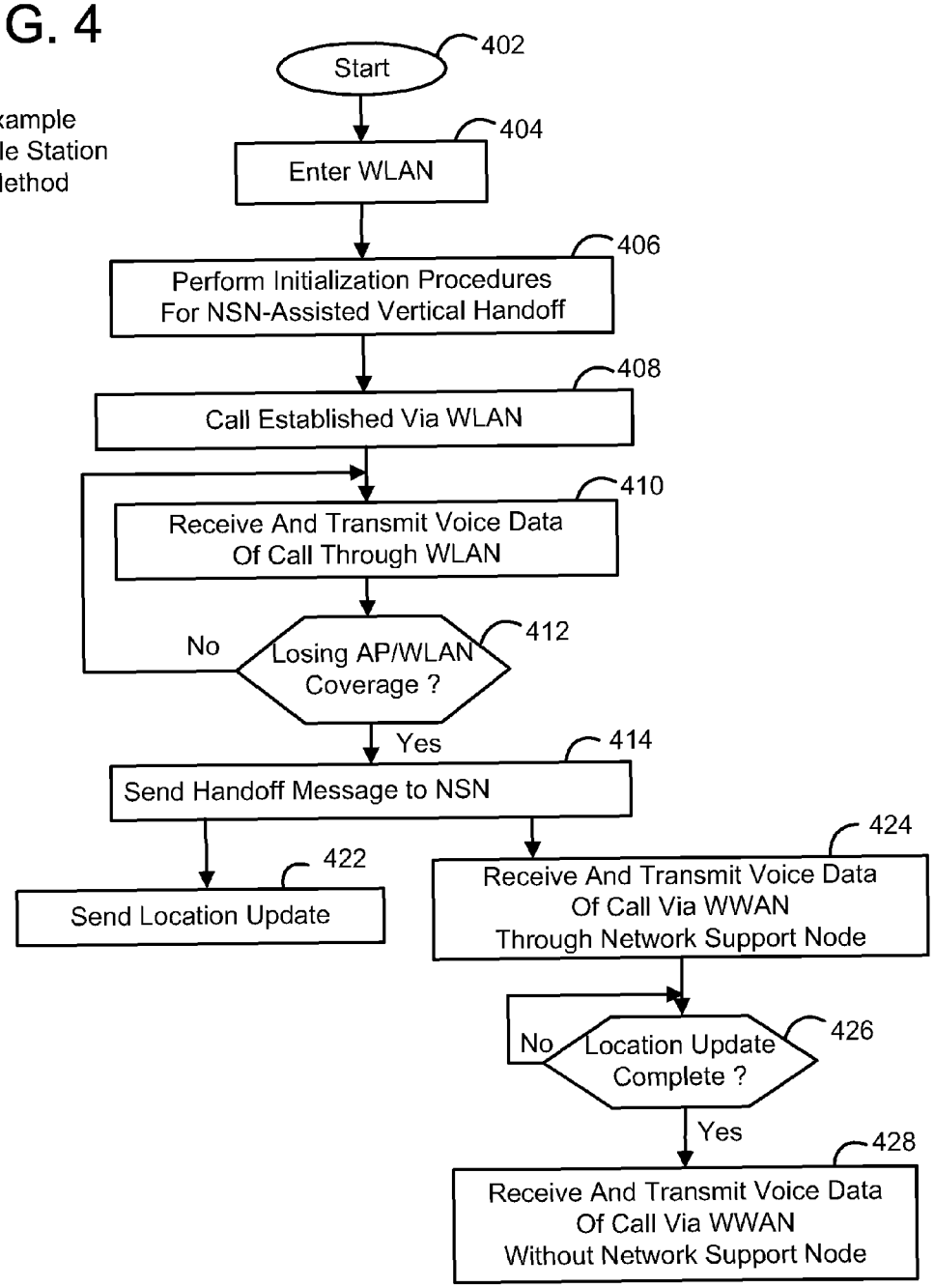
FIG. 4 is a flowchart which describes a mobile device method of switching communication operations between WLANs and WWANs for calls such as voice calls (e.g. VoIP calls) between communication devices.
Figure 5:
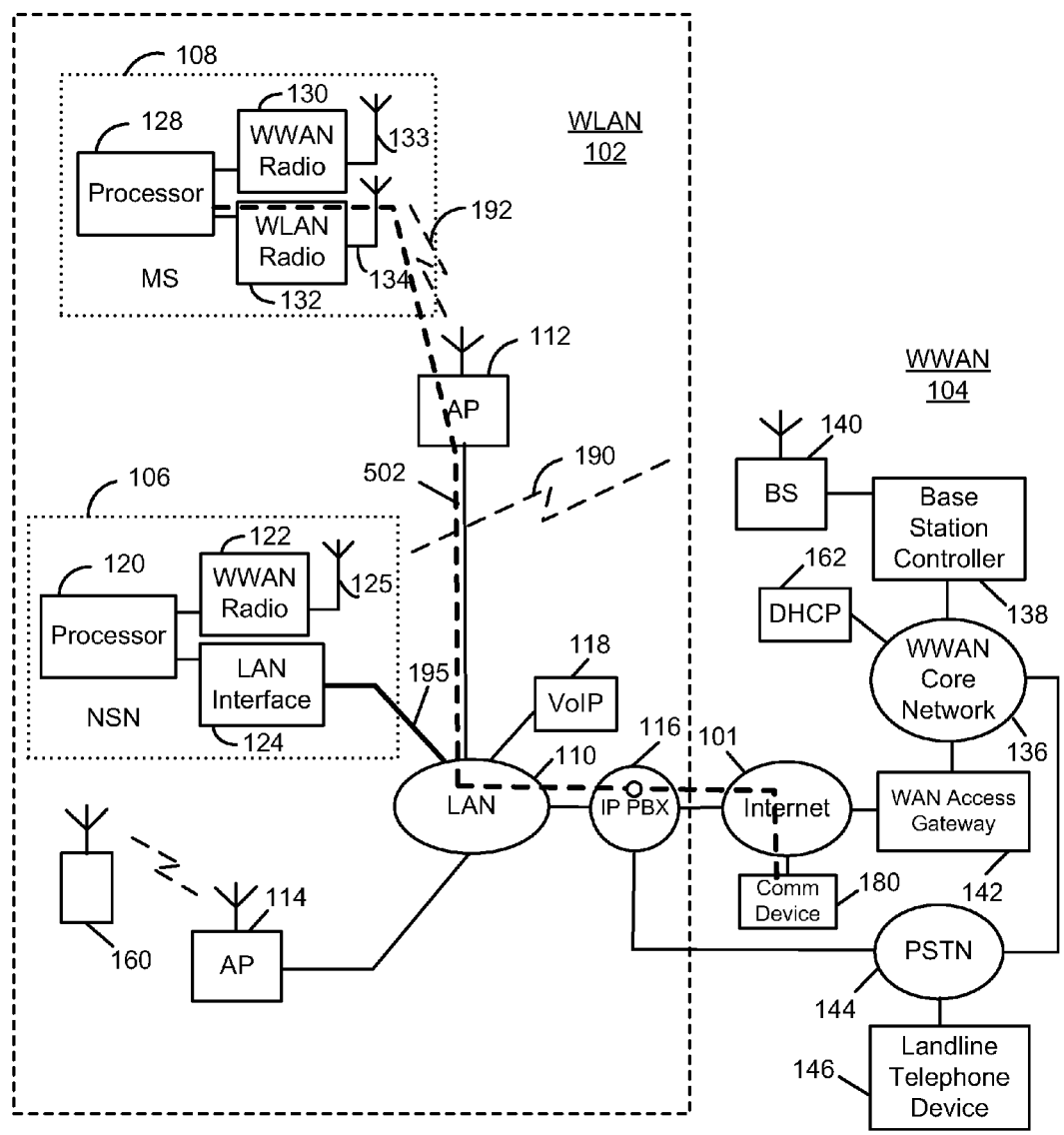
FIGS. 5-8 are illustrations of the communication system of FIG. 1 presented in time sequence according to the flowcharts of FIGS. 3-4, where in FIG. 5 a first state is represented showing a communication session established between the mobile communication device operating in the WLAN and another communication device.

FIG. 4 is a flowchart which describes a mobile device method of switching communication operations between WLANs and WWANs for calls such as voice calls (e.g. VoIP calls) between communication devices. This method compliments the method of the network support node described in relation to the flowchart of FIG. 3. The flowchart of FIG. 4 will be described together in relation to FIGS. 5-8, which are illustrations of the communication system of FIG. 1 presented in chronological sequence according to the flowchart of FIG. 4.

The technique of FIG. 4 may be performed by mobile device 108 of LAN 110 described in relation to FIG. 1. The technique described may further be part of a computer program product which includes a computer readable medium and computer instructions stored in the computer readable medium for use in being executed by one or more processors of the mobile device.

Beginning at a start block 402 of FIG. 4, the mobile device enters and operates in a WLAN of a communication network (step 404 of FIG. 4). To do this, the mobile device identifies a particular wireless access point (AP) of the WLAN, associates with the selected wireless AP, and sees to perform any authentication procedures necessary to gain access to services (e.g. VoIP and data services) provided in the communication network.

Next, the mobile device performs a registration or initialization procedure with a network support node of the communication network for assistance with vertical handover (VHO) (step 406 of FIG. 4). During the registration/initialization, the mobile device may provide its IP and link layer address to the network support node for subsequent use. The mobile device may also receive, from the network support node, the cellular network identification (e.g. MCC/MNC pair, SID, etc.) of the base station which communicates with the network support node. This information helps enable the mobile device to communicate with the network support node using the cellular base station after losing WLAN coverage. The mobile device then operates in the WLAN in steady-state operation.

Sometime during operation, the mobile device maintains a communication session in the WLAN with another communication device (step 408 of FIG. 4). To illustrate with respect to FIG. 5, for example, the mobile device may be mobile device 108, the other communication device in the communication session may be communication device 180, and the communication session may be a voice call such as a VoIP call represented by a call connection 502 which is established through LAN 110 and WLAN 102. The mobile device then receives and transmits voice data of the voice call via the WLAN as is conventional (step 410 of FIG. 4). Note that the voice call is initially established as two separate call legs between mobile device 108 in WLAN 102 and communication device 180 via IP-PBX controller 116 (or "gateway").

During the voice call, the mobile device continually monitors whether it is losing radio frequency (RF) coverage with wireless APs of the WLAN (tested at step 412 of FIG. 4). Alternatively in step 412, there may be a detection of an indication (manual or otherwise) that the mobile device desires or needs to transition from communication operation via the WLAN to communication operation via the WWAN (i.e. for VHO). If RF coverage of the WLAN is lost or other suitable condition is identified in step 412, the mobile device prepares to switch communication operations from the WLAN to a WWAN in steps 414-428 which follow. In particular, the mobile device sends a handoff message to the network support node via the WLAN (step 414 of FIG. 4). Alternatively, this handoff message is sent from the mobile device to the network support via the WWAN. Note that the mobile device may enable its WWAN radio interface, if not previously enabled, so that it may communicate with the WWAN. Also optionally, the mobile device may also disable its WLAN radio interface as communications from the WLAN may be severely degraded or non-existent.

At this point, the mobile device performs two processes in parallel as revealed by the flowchart of FIG. 4. In the first process, the mobile device requests/sends a location update using an IP address previously assigned to the mobile device by the WWAN (step 422 of FIG. 4). In the present embodiment, the location update is a SIP_INVITE to the IP-PBX controller or gateway, or other party of the voice call. Note that, prior to step 422, the mobile device requests an assignment of an IP address via the WWAN (e.g. via DHCP) and receives the IP address via the WWAN. In one variation, the mobile device acquires an IP address from the WWAN upon power-up or at least sometime before the voice call is placed. Keeping an IP address "alive" in the WWAN will typically require periodic communication with the cellular network. In such cases, the mobile device may always contact the network support node via the WWAN radio interface after acquiring an IP address.

In the second process, as the mobile device sent the handoff message to the network support node in step 414, it triggered the network support node to cause a communication session to be established with the mobile device via the WWAN for receiving voice data of the voice call. Here, the mobile device operates its WWAN radio interface with the WWAN so as to receive and transmit the voice data of the voice call via the network support node (step 424 of FIG. 4). The communication of the voice data of the voice call will continue at least during the switching of communication operations between the WLAN and the WWAN for the mobile device.

In this step, a traffic channel is established between the network support node and the base station. The network support node may contact or connect with the mobile device by sending one or more data messages to it through use an IP address of the mobile device in the WWAN. The communication session may involve VoIP or other proprietary communications. Preferably, the communication session is a "local" communication session which is routed only locally through the base station (and perhaps the base station controller) but not through the WWAN core network. At the other end of the call establishment, the mobile device "silently" and automatically receives and accepts the communications. In a variation of this technique, the mobile device initiates this session with the network support node.

To illustrate step 424 with respect to FIG. 6, network support node 106 operates to maintain an additional communication session with mobile device 108 via WWAN 104 at least during the WLAN-to-WWAN switching operation for mobile device 108. The voice data are communicated between the router in LAN 110 and network support node 106 via an additional connection 602 as shown. Also as shown, these voice data are further communicated with mobile device 108 through network support node 108 via WWAN 104. Also apparent, the voice data are communicated to/from network support node 106 and base station 140 of WWAN 104 over wireless communication link 190, and to/from mobile device 108 and base station 140 of WWAN 104 over a wireless communication link 190. At some point in time, however, the mobile device may lose WLAN coverage completely, where a substantial portion of the original call connection 502 is terminated. This state is illustrated in connection with FIG. 7. Although the portion of the original call connection is terminated, call connection 602 through the network support node via WWAN 104 remains.

Referring back to the flowchart of FIG. 4, while the mobile device is receiving the voice data of the voice call in step 424, it is anticipating the completion of the location update requested in step 422 (step 426 of FIG. 6). Once the location update is completed as identified in step 426, then the mobile device no longer will receive the voice data of the voice call via the network support node. Rather, after the location update is performed, the WAN reestablishes the call connections via the WAN access gateway so that the voice call is anchored within the WAN and outside of the LAN. Thus, the mobile device receives and transmits the voice data of the voice call with the WWAN without use of the network support node (step 428 of FIG. 4). This state is illustrated with respect to FIG. 8. Note that since two separate call legs were initially established between mobile device 108 in WLAN 102 and communication device 180 via IP-PBX controller 116, the call leg for mobile device 108 is controlled so as to "follow" the mobile device to WWAN 104, without requiring involvement of or special techniques at communication device 180 during the transition.

Again, although the call and handover technique has been described with respect to communication device 180 on the Internet 101, the technique may be similarly performed with respect to a different type of communication device such as landline telephone device 146 in PSTN 144 without the use of WAN access gateway. Note further that, although the example described relates to a transition from the WLAN to the WWAN, the technique may be applied to a transition from the WWAN to the WLAN.

Thus, although a variety of wireless relaying mechanisms have been proposed to augment coverage for mobile devices, the prior art does not teach or suggest an infrastructure-client node approach utilized in the manner as described herein. The techniques of the present disclosure need not require any significant upgrade to wireless APs or the base station of the WWAN. The techniques are also independent of the mobility management scheme used. Preferably, the handover process is mobile device-initiated which allows the approach to be suitable for IEEE 802.11. The value of the present techniques is most apparent in situations where abrupt WLAN coverage transitions cause rapid link loss at the edge of the WLAN coverage area. The techniques also need only a single network support node per WLAN subnet. The inventive technique is not a coverage extension technique, but rather helps maintain the data packet flow of mobile devices while performing VHO.

Methods and apparatus for use in switching communication operations between a wireless local area network (WLAN) and a wireless wide area network (WWAN) for a mobile communication device with use of a network support node have been described. The network support node has a first communication interface (e.g. an Ethernet interface) for connection with a communication network which includes the WLAN, and a second communication interface (e.g. a cellular radio air interface) for communicating with a base station of the WWAN over a wireless communication link. The mobile device initially operates in the WLAN in a communication session with another communication device. During the session, the network support node receives an indication that the mobile device is transitioning from the WLAN to the WWAN. In response to receiving the indication, the network support node causes a message to be sent which instructs a router of the communication network to communicate voice data of the session to it. In response to the message, the network support node receives the voice data of the session from the router through its first communication interface. The network support node communicates the voice data with the mobile device via the WWAN through its second communication interface over the wireless communication link with the base station. These communications are performed at least while communication operations for the mobile device are being switched from the WLAN to the WWAN. Advantageously, disruption of communications during the WLAN-to-WWAN transition is reduced or eliminated.

The above-described embodiments of the present application are intended to be examples only. For example, the embodiments of the present disclosure were described with respect to the case where the WLAN was an IEEE 802.11-based network and the WWAN was a cellular telecommunications network. However, the WLAN and WWAN may be networks different from those networks, as long as the WLAN type network covers a smaller region relative to the WWAN type network. For example, one of the networks may be a WiMAX network, and the other network may be a cellular network or an IEEE 802.11-based network. Alternatively, for example, one of the networks may be a Bluetooth-based network, and the other network may be a cellular network or an IEEE 802.11-based network. As another example, although the embodiments of the present disclosure were described with respect to WLAN-to-WWAN transitioning for voice calls, the techniques may similarly to other types of (real-time) media streams for other types of data connections, such as video and/or audio media over data connections or calls. Those of skill in the art may effect alterations, modifications and variations to the particular embodiments without departing from the scope of the application. The invention described herein in the recited claims intends to cover and embrace all suitable changes in technology.

What is claimed is:

1. A method of a network support node for use in communicating data, the method comprising:
    providing a network support node which includes a local area network (LAN) interface and a cellular RF interface, the LAN interface being configured to connect the network support node as a LAN node in a LAN, the cellular RF interface being configured to provide wireless communications over a wireless communication link with a base station of a cellular network;
    operating the network support node as a client end station with the base station of the cellular network with use of the cellular RF interface;
    receiving, at the network support node, at least one of an IP address and a link layer address of a mobile communication device;
    receiving, at the network support node, from the LAN via the LAN interface, voice data of a voice communication session between the mobile communication device and an electronic device, the voice data being addressed to the at least one of the IP address and the link layer address of the mobile communication device;
    establishing and maintaining, at the network support node, an additional communication session with the mobile communication device via the cellular RF interface over the wireless communication link with the base station; and
    communicating, in the additional communication session with the mobile communication device, the voice data of the voice communication session between the mobile communication device and the electronic device.

2. The method of claim 1, wherein the voice data being communicated in the voice communication session with the mobile communication device is communicated via a wireless local area network (WLAN) of the LAN.

3. The method of claim 1, wherein the voice communication session comprises a Voice over IP (VoIP) communication session.

4. The method of claim 1, wherein the voice communication session comprises a voice call between the mobile communication device and the electronic device.

5. The method of claim 1, wherein the voice data being communicated in the voice communication session with the mobile communication device is communicated via a wireless local area network (WLAN) of the LAN, the WLAN comprising an IEEE 802.11 compliant network.

6. The method of claim 2, wherein the act of receiving the voice data is performed in response to a transition indication of the mobile communication device from the WLAN to the cellular network.

7. The method of claim 2, further comprising:
receiving, at the network support node, an indication that the mobile communication device is transitioning from the WLAN to the cellular network; and
in response to receiving the indication, causing a message to be sent to a router in the communication network for receiving the voice data.

8. The method of claim 1, which is embodied as a computer program product comprising a non-transitory computer readable medium and computer instructions stored in the non-transitory computer readable medium which are executable to perform the acts of receiving and communicating of the method.

9. A network support node, comprising:
one or more processors;
a local area network (LAN) interface coupled to the one or more processors and configured to connect to a LAN which includes a wireless local area network (WLAN);
a cellular RF interface coupled to the one or more processors and configured to communicate over a wireless communication link with a base station of a cellular network;
the one or more processors configured to:
operate the network support node as a client end station with the base station of the cellular network over the with use of the cellular RF interface;
receive at least one of an IP address and a link layer address of a mobile communication device;
receive, from the LAN via the LAN interface, voice data of a voice communication session between the mobile communication device and an electronic device, the voice data being addressed to the at least one of the IP address and the link layer address of the mobile communication device;
establish and maintain, at the network support node, an additional communication session with the mobile communication device via the cellular RF interface over the wireless communication link with the base station; and
communicate, in the additional communication session with the mobile communication device, the voice data of the voice communication session between the mobile communication device and the electronic device.

10. The network support node of claim 9, wherein the voice data being communicated in the communication session with the mobile communication device is communicated via a wireless local area network (WLAN) of the LAN.

11. The network support node of claim 9, wherein the voice communication session comprises a Voice over IP (VoIP) communication session.

12. The network support node of claim 9, wherein the voice communication session comprises a voice call.

13. The network support node of claim 9, wherein the voice data being communicated in the voice communication session with the mobile communication device is communicated via a wireless local area network (WLAN) of the LAN, the WLAN comprising an IEEE 802.11 compliant network.

14. The network support node of claim 10, wherein the one or more processors are configured to receive the voice data in response to a transition indication of the mobile communication device from the WLAN to the cellular network.

15. The network support node of claim 10, wherein the one or more processors are further configured to:
receive, at the network support node, an indication that the mobile communication device is transitioning from the WLAN to the cellular network; and
in response to receiving the indication, cause a message to be sent to a router in the communication network for receiving the voice data.

* * * * *